United States Patent Office 3,278,269
Patented Oct. 11, 1966

3,278,269
SULPHUR TREATMENT
Frank Anthony Ekker, Ponchatoula, and Tadeusz K. Wiewiorowski, New Orleans, La., assignors to Freeport Sulphur Company, New York, N.Y., a corporation of Delaware
No Drawing. Filed Aug. 13, 1963, Ser. No. 301,887
13 Claims. (Cl. 23—224)

This invention relates to improved sulphur compositions and more particularly relates to methods and compositions for treating molten sulphur which facilitate the recovery of solid sulphur from storage.

Frequently, in industrial handling of sulphur, it becomes necessary to solidify this material from its molten state. This is usually accomplished by pouring the molten sulphur into so-called slabs or vats. The term "sulphur slab" usually refers to a single horizontal layer, up to about 10 inches thick, of sulphur solidified from its molten state. Sulphur vats constitute a convenient way of storing large amounts of solid sulphur. In modern technology, a vat is a large block of sulphur usually, but not necessarily, consisting of a number of slabs prepared by repeated pouring of molten sulphur while allowing sufficient time between the pourings for the individual layers to solidify.

It is known to those skilled in the art that when molten sulphur is poured into such vats or slabs for cooling and solidification, the resulting solid sulphur has such structural characteristics and physical strength that it is difficult to crush and break into so-called bulk or solid sulphur. This difficulty in the handling of sulphur solidified from its molten state is expensive in its consequences. Because of the sulphur's high physical strength, heavy and expensive equipment is required to break the slabs or vats into bulk sulphur.

Two methods are known in the art to control the friability of sulphur solidified from its molten state. Both, however, have serious disadvantages. One of these methods allows for a limited control over the strength of the vats by varying the thickness of the individual sulphur layers constituting a vat. It is known that the thicker these layers are, the weaker is the structure of the vat. The method of reducing physical strength by increasing layer thickness has definite disadvantages. First, the physical strength of the vat or slab is reduced only to a limited extent. Second, by pouring thicker sulphur layers the cooling rates are reduced, and therefore more time is required to produce a vat of a given size. Third, by pouring thick layers the possibility of molten sulphur pocket formation in the vat is created. These molten sulphur pockets, in which the sulphur remains at over 238.1° F., constitute a hazard to the operating personnel.

The second method known to the art consists of adding gaseous ammonia to molten sulphur prior to solidification. By an unknown mechanism the presence of small amounts of ammonia increases the friability of the solid sulphur. The disadvantage in using ammonia for this purpose lies in the necessary inconvenience of having special equipment in order to carry out the addition of a gaseous substance to molten sulphur. This equipment consists of an ammonia tank, tubing, valves, pressure gauges, etc. At many locations to which molten sulphur is delivered, such equipment is unavailable.

Thus, in the past, there was no convenient method by which the physical strength of sulphur vats or slabs could be efficiently controlled.

It is an object of this invention to provide a method for decreasing the physical strength and improving the handling properties of sulphur solidified from the molten state.

It is another object of the present invention to provide sulphur compositions comprising sulphur and a small amount of an additive for sulphur that is to be stored in solid vat or slab form, which renders the solidified sulphur more easily recoverable from storage by increasing its friability.

It is another object of this invention to provide an additive for sulphur that is to be stored in slabs or vats that not only increases its friability but also in many cases improves grind-ability and screen-ability, reduces the amorphous content and reduces the electrostatic charge of the sulphur.

It is a further object of this invention to provide an additive for sulphur that is to be stored in vats or slabs which has a reduced explosive hazard and reduced toxicity, compared with additives presently known, and which remains in the sulphur and in many cases upon subsequent liquefaction and solidification continues to impart improved characteristics to the sulphur through many successive meltings and solidifications.

The utility of this invention lies in the fact that molten sulphur chemically treated as described herein yields, upon solidification, a material of lower physical strength, which is more friable, and easier to crush and handle as compared to untreated sulphur.

The objects of this invention may be achieved by adding certain liquid or solid compounds or additives to molten sulphur prior to its storage and solidification. Surprisingly, it has been found that liquid and solid basic organic amines will increase the friability of sulphur if added to the molten sulphur prior to solidification.

Furthermore, the treatment of the sulphur in accordance with the invention frequently also improves the grinding and screening characteristics of sulphur, as well as reducing its electrostatic charge and amorphous sulphur content.

The compounds or additives for the sulphur which have been found to be effective in the practice of this invention belong to the class of compounds consisting of:

A. Liquid and solid, primary, secondary and tertiary, alkyl, aryl and cyclic amines having a $K_B$ value greater than $10^{-10}$ in which the amino nitrogen is attached to a primary, secondary or aromatic carbon atom. Such amines include: n-butylamine, tetradecyldimethylamine, aniline, cyclohexylamine, N,N-diethylcyclohexylamine, N-methylpyrrolidine, pyridine, tetraethylenepentamine, ethylenediamine, piperidine, pyrrole, piperazine, 1-amino-2-propanol, indole, 1-(2-aminoethyl)-2-(n-heptadecenyl-2)-imidazoline, n-amylamine, N,N-dimethyldodecylamine, N,N-dimethyltetradecylamine, N,N-dimethylhexadecylamine, N,N-dimethyloctadecylamine, N,N-dimethylamylamine, α-methylamylamine, propylamine, β,β-dimethylpropylamine, sec-butylamine, isobutylamine, hexylamine, N,N-dimethylhexylamine, n-heptylamine, N,N-dimethylheptylamine, octylamine, etc.

B. Quaternary nitrogen compounds which decompose between 20 and 160° C. to yield ammonia. Such compounds include ammonium carbonate, ammonium bicarbonate, etc.

C. Quaternary nitrogen compounds which on heating to temperatures between 20 and 160° C. decompose to yield an organic amine having a $K_B$ value greater than $10^{-10}$ in which the carbon atom or atoms directly attached to the amino nitrogen is primary, secondary or aromatic. Such compounds include tetramethylammonium hydroxide, tetraethylammonium hydroxides, etc.

As used throughout this disclosure the term $K_B$ identifies the equilibrium constant defined by the equation:

$$K_B = \frac{[OH^-]x[BH^+]}{[B]}$$

which applies to the reaction:

$$B + H_2O \rightleftharpoons BH^+ + OH^-$$

where B is a basic compound, $OH^-$ is a hydroxide ion and $BH^+$ is the ion formed when a hydrogen ion has been added to the basic compound, and the concentrations, $[OH^-]$, $[BH^+]$, and $[B]$ are expressed in mols per liter. The equilibrium constant is further described in The Chemistry of Organic Compounds, J. B. Conant and A. H. Blott, Macmillan, 3rd ed., 1947, New York, p. 187, inter alia.

While organic amines having a $K_B$ value of $10^{-10}$ are suitable in the practice of this invention, improved results are obtained with those organic amines having a $K_B$ value greater than $10^{-8}$.

All of the compounds of paragraph A and all of the decomposition products of paragraphs B and C contain at least one basic nitrogen atom per molecule. Throughout the present disclosure the compounds of paragraphs A, B and C are referred to as "basic amines."

By adding to the molten sulphur an additive which thermally decomposes to yield ammonia, it is not necessary to use expensive equipment in order to place the ammonia into the sulphur. The fact that the ammonia forming compounds would be effective is not obvious from what is known about such products. For instance, ammonium carbonate, when added to molten sulphur, floats on the sulphur surface while decomposing into ammonia, carbon dioxide and water. It would be expected that the volatile reaction products would escape to the atmosphere and that ammonium carbonate would not be effective in reducing the friability of the stored sulphur. Surprisingly, however, it has been found that with very little agitation a portion of the ammonia released from the ammonium carbonate remains in the molten sulphur and increases the sulphur friability after solidification.

The basic amine additives employed in the present invention may be introduced into the molten sulphur either as a solid, a concentrated liquid, or a solution. The solution may be an aqueous solution or a solution of basic amines in organic solvents such as benzene, toluene, carbon tetrachloride and the like. The basic amines may be used singly or two or more may be used together.

The addition of the basic amines to molten sulphur may be accomplished in a number of ways. For example, the additive may be injected into a molten sulphur pipe line, or the basic amine may be added to a tank equipped with an agitator or to a vessel used to ship molten sulphur, such as tank cars, liquid sulphur barges, and the like. Preferably the basic amines are added to the molten sulphur just before it is stored in the solid state.

The amount of basic amine required to achieve the desired reduction in physical strength is at least about 0.0001% by weight. Larger amounts may be employed, but no advantage in results is normally obtained in excess of about 0.5% by weight of sulphur. These values correspond to between about one to five thousand (1 to 5,000) parts per million by weight of treated sulphur, the preferred amount being about 50 parts per million.

While the basic amines may be added to the sulphur at any temperature at which the sulphur is molten, it is desirable to maintain the temperature of the sulphur between about 119° C. and 160° C. while the basic amine is being added. Within this temperature range, sulphur has a relatively low viscosity which facilitates easy mixing and uniform distribution of the additive throughout the bulk of the sulphur. Because only small amounts of basic amine are required, the additive does not have to be heated prior to addition. It is preferred to maintain the molten sulphur in the range between 125 and 155° C. during addition of the basic amine.

The effect of the basic amine additives in reducing the physical strength of the sulphur is observable immediately after solidification by the increased friability of the solid sulphur. The treated sulphur retains the increased friability and reduced strength indefinitely. It is a feature of this invention that the desirable properties are in many cases retained through many subsequent meltings and solidifications of the sulphur where compounds of paragraph A and C are used. Another feature of this invention is the reduction of the explosion and poisoning hazard over those processes using gaseous ammonia.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

*Example 1*

Tetradecyldimethylamine was added to molten sulphur in an amount of 50 parts per million by weight just prior to solidification of the sulphur. During the addition of the tetradecyldimethylamine additive, the temperature of the molten sulphur was maintained in the range between 125 and 155° C. The molten sulphur treated in this manner was poured into a slab five inches thick and allowed to solidify. The resulting solid sulphur had excellent handling properties, was friable and easily broken up into bulk sulphur.

*Examples 2–10*

In order to obtain a quantitative comparison of the friability of treated and untreated sulphur, basic amines were added to 1000 g. samples of molten sulphur at 125–155° C. which was contained in a 2 liter beaker. As a standard, one specimen was prepared without any additive. The mixtures of sulphur and basic amine additives were stirred and poured into a cylindrical quart paper container where they were allowed to cool and solidify without being disturbed. After solidification the paper container was removed, and a cylindrical sulphur specimen was obtained. The friability of the specimen was tested by the method of N. B. Mitchell described in Materials Research and Standards 1,780 (1961). The specimen was placed between two parallel steel plates tangent to the cylindrical surface. A compressive force was applied by the plates and gradually increased. The force value at which the specimen crushed was recorded. The strength of the sulphur was calculated using the equation:

$$S = \frac{2P}{\pi x H x D}$$

where S equals the strength of the sulphur in pounds per square inch, P equals the compressive force applied to the sulphur, H equals the length of the sulphur cylinder along its longitudinal axis and D equals the diameter.

The results are recorded in Table 1 below:

TABLE 1

| Example | Additive | Amt. of additive used per 1,000 g. of sulphur, mg. | Strength of the sulphur specimen, p.s.i. |
|---|---|---|---|
| 2 | None | | 86.1 |
| 3 | Ammonia | 50 | 17.3 |
| 4 | Ammonium carbonate | 50 | 17.3 |
| 5 | Ammonium bicarbonate | 50 | 15.9 |
| 6 | Tetradecyldimethylamine | 10 | 8.35 |
| 7 | ------do------ | 50 | 4.96 |
| 8 | ------do------ | 100 | 4.18 |
| 9 | 1-(2-aminoethyl)-2-(n-heptadecenyl-2)-imidazoline. | 10 | 7.83 |
| 10 | ------do------ | 50 | 3.45 |

As will be noted from the foregoing Table 1, the organic amine additives of the present invention produced a sulphur composition, which upon solidification, possessed much lower physical strength than when ammonia or no additive was employed.

*Example 11*

Into a tank car containing molten sulphur at about 145° C., tetradecyldimethylamine was added in the amount of 50 parts per million by pouring the additive into the hatch of the tank car. The splashing of sulphur normally encountered during transportation produced uniform mixing. The treated sulphur after being delivered to the point of destination was poured into four inch thick by five foot square slabs. The improvement in the handling properties of the treated sulphur as compared to untreated sulphur was surprisingly great. The solidified slabs broke easily when lifted with a shovel, while an untreated sulphur slab of the same dimensions did not break when lifted with the shovel, but was raised in one piece.

In the foregoing examples, in place of the liquid or solid basic organic amine employed, one may employ one of the following: n-butylamine, aniline, cyclohexylamine, N,N-diethylcyclohexylamine, N-methyl-pyrrolidine, pyridine, tetraethylenepentamine, ethylenediamine, piperidine, pyrrole, piperazine, 1-amino-2-propanol, indole, n-amylamine, N,N-dimethyldodecylamine, sec-butylamine, isobutylamine, etc.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A composition of matter consisting essentially of sulphur containing at least about one part per million up to about 100 parts per million of an additive selected from a class consisting of liquid and solid organic amines having a $K_B$ value of greater than $10^{-10}$.

2. A composition of matter consisting essentially of sulphur containing at least about one part per million up to about 100 parts per million of an additive consisting essentially of at least one member of the class consisting of (A) liquid and solid organic amines having a $K_B$ value greater than $10^{-10}$ and in which the amino nitrogen is attached to a carbon atom which is not a tertiary carbon atom; (B) liquid and solid quaternary nitrogen compounds which decompose below 160° C. to yield ammonia, and (C) liquid and solid quaternary nitrogen compounds which decompose below 160° C. to yield an organic amine having a $K_B$ value greater than $10^{-10}$ and in which the carbon atom directly attached to the amino nitrogen is not a tertiary carbon atom.

3. A composition of matter according to claim 2 wherein said $K_B$ value is greater than $10^{-8}$.

4. A composition of matter according to claim 2 wherein said quaternary nitrogen compounds decompose between 20 and 160° C.

5. A composition of matter consisting essentially of sulphur containing about 50 parts per million of additive consisting essentially of at least one member of the class consisting of (A) liquid and solid organic amines having a $K_B$ value greater than $10^{-10}$ and in which the amino nitrogen is attached to a carbon atom which is not a tertiary carbon atom; (B) liquid and solid quaternary nitrogen compounds which decompose below 160° C. to yield ammonia, and (C) liquid and solid quaternary nitrogen compounds which decompose below 160° C. to yield an organic amine having a $K_B$ value greater than $10^{-10}$ and in which the carbon atom directly attached to the amino nitrogen is not a tertiary carbon atom.

6. A method of reducing the physical strength of solid sulphur comprising adding to molten sulphur an additive comprising at least one member selected from the class consisting of (A) liquid and solid organic amines, having a $K_B$ value greater than $10^{-10}$ and in which the amino nitrogen is attached to a carbon atom selected from the class consisting of primary, secondary, and aromatic carbon atoms, (B) liquid and solid quaternary nitrogen compounds which decompose below 160° C. to yield ammonia, and (C) liquid and solid quaternary nitrogen compounds which decompose below 160° C. to yield an organic amine having a $K_B$ value greater than $10^{-10}$ and in which the carbon atom directly attached to the amino nitrogen is selected from the class consisting of primary, secondary, and aromatic carbon atoms; and cooling the sulphur to a solid wherein said additive is added in an amount between about 1 to 100 parts per million.

7. A method according to claim 6 wherein said additive is added in an amount of about 50 parts per million.

8. A method according to claim 6 wherein said sulphur is maintained at a temperature between about 119 and 160° C. during the addition of the additive.

9. A method according to claim 6 wherein said sulphur is maintained at a temperature of between about 125 and 155° C. during the addition of the additive.

10. A method according to claim 6 wherein said $K_B$ value is greater than $10^{-8}$.

11. In the process of storing sulphur and recovering the sulphur from storage in which molten sulphur is deposited in layers to cool to a solid and the solid sulphur is later removed and reduced in size into bulk sulphur, the improvement for rendering the solid sulphur more easily recoverable comprising adding to the molten sulphur prior to storage an additive comprising at least one member selected from the class consisting of (A) liquid and solid organic amines, having a $K_B$ value greater than $10^{-10}$ and in which the amino nitrogen is attached to a primary, secondary or aromatic carbon atom, (B) liquid and solid quaternary nitrogen compounds which decompose below 160° C. to yield ammonia, and (C) liquid and solid quaternary nitrogen compounds which decompose below 160° C. to yield an organic amine having a $K_B$ value greater than $10^{-10}$ and in which the carbon atom directly attached to the amino nitrogen is primary, secondary or aromatic wherein said additive is added in an amount between about 1 to 100 parts per million.

12. In the process of storing sulphur and recovering the sulphur from storage in which liquid sulphur is deposited in layers to cool to a solid, and the solid sulphur is later removed and reduced in size into bulk sulphur, the improvement for rendering the solid sulphur more easily recoverable comprising adding about 50 parts per million of tetradecyldimethylamine to the molten sulphur prior to storage.

13. In the process of storing sulphur and recovering the sulphur from storage in which liquid sulphur is deposited in layers to cool to a solid, and the solid sulphur is later removed and broken into bulk sulphur, the improvement for rendering the solid sulphur more easily recoverable comprising maintaining the molten sulphur at a temperature between about 125 and 155° C. and adding about 50 parts per million of tetradecyldimethylamine to the molten sulphur prior to storage, and cooling the sulphur to a solid.

References Cited by the Examiner

UNITED STATES PATENTS 2,080,409   5/1937   Ceccon _____ 23—224 X

OSCAR R. VERTIZ, *Primary Examiner.*

MAURICE A. BRINDISI, MILTON WEISSMAN,
*Examiners.*

H. S. MILLER, A. J. GREIF, *Assistant Examiners.*